March 24, 1970  G. K. HURD  3,502,066
BLOWERLESS HEATER
Filed Aug. 26, 1968
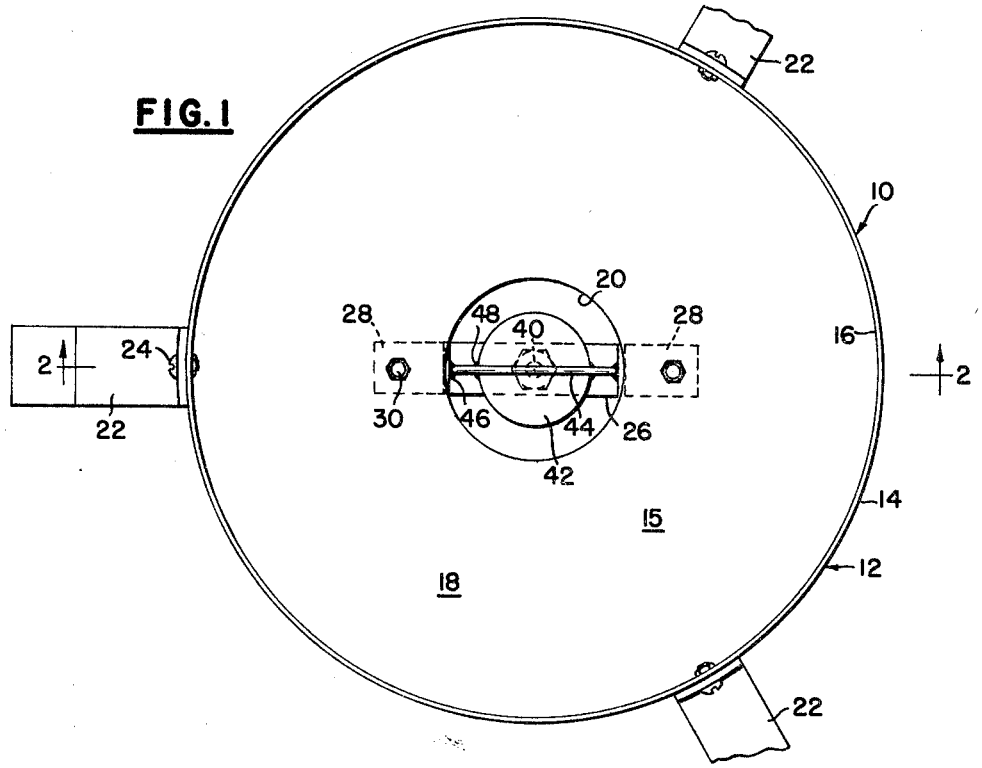
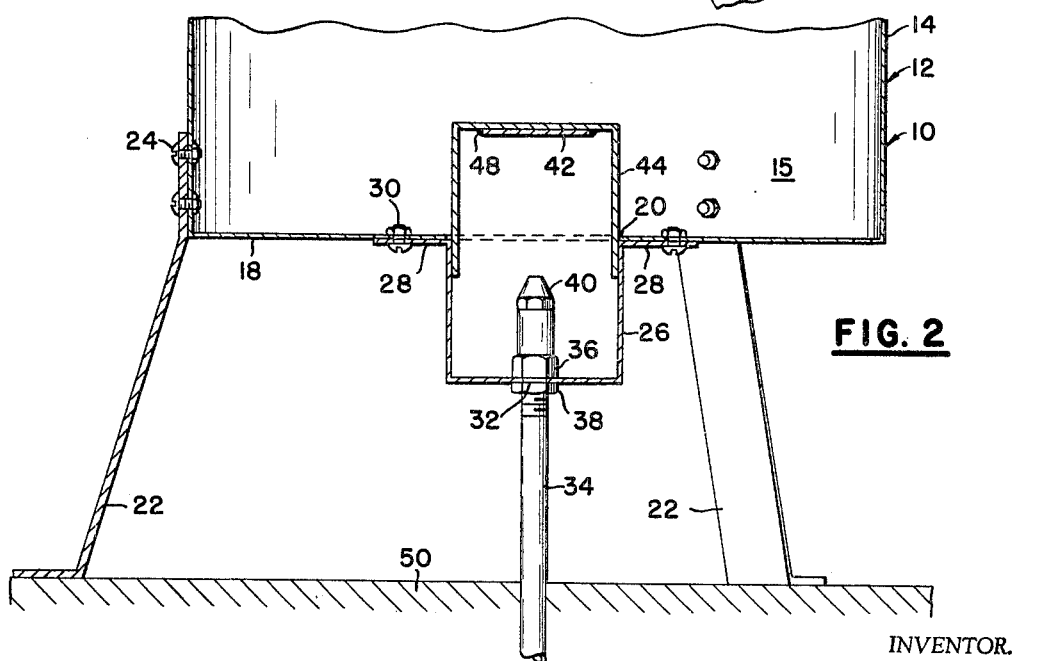
INVENTOR.
GEORGE K. HURD
BY *Harry A. Schofer*
ATTORNEY United States Patent Office 3,502,066
Patented Mar. 24, 1970

3,502,066
BLOWERLESS HEATER
George K. Hurd, Pompano Beach, Fla., assignor to Joy M. Thomas, Pompano Beach, Fla.
Filed Aug. 26, 1968, Ser. No. 755,171
Int. Cl. A01g *13/06;* F23d *15/02*
U.S. Cl. 126—59.5
3 Claims

ABSTRACT OF THE DISCLOSURE

A blowerless or natural draft heater for orchards, groves and growing crops and the like, having an elongated tubular combustor including an outlet and a restricted inlet into which an atomized jet of liquid hydrocarbon fuel is injected, the jet of fuel entraining the proper quantity of air from the ambient atmosphere to assure complete, smokeless, combustion, and a baffle spaced inwardly of the opening to divert the incoming fuel and air, the dimensions, spacing, and relationship of parts being critical to assure such complete combustion of the fuel and atmospheric air without resorting to a blower or other positive air supply means.

BACKGROUND OF THE INVENTION

This invention relates to heaters in general, and more particularly to a natural draft or blowerless heater for heating exposed areas such as orchards and groves, or areas where fruits, vegetables and flowers, as well as trees and plants from the danger of frost damage.

In many areas of the country, crops are frequently exposed to killing frosts, resulting in the loss of a large part of all of the growing crops, trees and plants, with resultant loss of millions of dollars. As an example, the citrus belt in Florida occupies a large portion of the central part of the state, which is eminently suitable for such purpose because of the soil and climatic conditions. This belt is below the normal frost line of the country, but on occasions the temperature drops sufficiently low to cause considerable damage to both the trees and the growing crops.

Various methods are used to minimize the danger of killing frost. Spraying the trees with water is sometimes employed, but this is risky, especially if the temperature drops sufficiently low and is sustained, which will cause the water to freeze, whereby the damage from the ice can be worse than that from the frost.

Another method involves the production of heat by burning old automobile tires. Aside from producing considerable smoke and objectionable odors, this method has limited use, and is used mostly by relatively small growers in areas located far from residential areas.

Another method employed, and the most common, involves the use of heaters burning liquid hydrocarbon fuels. Large fruit growers use hundreds of liquid fuel heaters, which call for the burning of large quantities of fuel.

The heavier liquid hydrocarbon fuels, such as diesel fuels 2 and 3, and the fuel oils 1, 2, 3 and 4, are the cheapest, but in most cases require the supply of pressurized air to obtain smokeless and complete combustion. The necessity of using blowers for such heaters has so far discouraged growers from using this type of heater, as it is impractical to operate blowers to supply hundreds of scattered heaters. A form of heater commonly employed, known as a smudge pot, does not require a blower to supply the air for combustion. In this form of heater the fuel is vaporized by the heat of combustion. Prior to being fed to the burner the air is preheated by being circulated through a return line or jacket exposed to the heat of the combustion chamber. This type of heater is bulky, exceedingly difficult to start, and does not produce complete combustion, as evidenced by the smoke produced by incomplete combustion and by the buildup of soot on the walls of the combustor.

After considerable and lengthy analysis, investigation and experiment, I have discovered that it is possible to produce a heater in which the liquid fuel can be supplied to an atomizing nozzle under pressure and completely burned without the necessity of using a blower, or by providing means to vaporize the liquid fuel by the heat from the combustion chamber as in the case of the smudge pot. My invention involves critical dimensions, spacing, and relationships of parts, within which limits the combustion is complete and stabilized, and outside of which limits the combustion drops off rapidly to an exceedingly poor condition or is absent.

SUMMARY OF INVENTION

My invention involves a blowerless heater comprising a combustor in which a constant supply of atomized liquid fuel and air is mixed and burned to completion, and a liquid atomizer injects a hydrocarbon fuel into the combustion chamber of the combustor. The combustor comprises an elongated tubular member of critical dimensions, having an opening in the inlet end through which the atomized fuel and air are supplied, and an outlet end from which the combustion products discharge. The inlet end of the tubular member includes a closure having an opening therein of critical dimensions and, spaced outwardly from the opening at a critical distance, is an atomizing nozzle directed to discharge an atomized jet of fuel through the opening into the interior of the combustor to entrain air from the ambient atmosphere, the entrained air and atomized fuel in proper proportions being homogeneously mixed and the completely burned in the combustion chamber of the combustor. A baffle within the combustion chamber, spaced a critical distance from and in line with the opening, diverts the incoming fuel and air toward the side wall of the combustion chamber. Through a critical use of dimensions of the various parts, critical relationships, and critical spacing thereof, I am able to provide a heater that is capable of using the cheaper grades of liquid hydrocarbon fuels without the necessity of a blower or other positive means to supply air to the combustion chamber. My novel heater employs the jet of atomized fuel to entrain the proper amount of ambient air and to prdouce a homogeneous mixture of air and fuel that will result in complete and stabilized combustion, free from smoke and soot buildup. The particular critical dimensions, sizes and relationships of parts are set out hereinafter in greater detail in the following decription of the preferred embodiment of the invention and in the subjoined claims.

It is an object of my invention to provide a novel heater capable of complete combustion of the cheaper grades of liquid hydrocarbon fuels without using a blower or other positive air delivery means.

It is a further object of my invention to provide a novel heater having critical dimensions, sizes, and relationships of parts, which will enable it to completely burn cheaper grades of liquid hydrocarbon fuels without using a blower or other positive air delivery means.

It is a still further object to provide a novel blowerless heater which is light in weight, economical to manufacture, requiring little or no maintenance, easy to start and to maintain stabilized combustion, and which is ideally suited for heating areas such as groves, orchards, and truck gardens, where fruit, vegetables and flowers are exposed to the danger of killing frost.

With the foregoing and other objects in view which will appear in the following specification, the invention resides in the novel combination and arrangement of parts and/or details of construction hereinafter described and claimed, and illustrated in the accompanying drawings, in which:

FIG. 1 is a top plan view of an embodiment of my novel blowerless heater, looking downward from the open discharge end thereof; and FIG. 2 is a sectional view through the heater of FIG. 1 as indicated on the section line 2—2 thereof.

Referring to the accompanying drawings wherein the same reference numerals are used to designate corresponding parts in the several figures, the blowerless heater in its entirety is designated by the numeral 10 and includes a combustor 12 having a side wall 14 of elongated tubular construction, preferably made of sheet steel, and defining a combustion chamber 15. The upper or discharge end of the combustor 12 is open as shown at 16, and the lower or supply end is covered by a closure 18 having a centrally disposed inlet opening 20 of sufficient size to receive the supply of air and atomized fuel as will be noted hereinafter. The combustor 12 is supported by a tripod structure comprising three legs 22 bolted at 24 to the side wall 14 at equally spaced points along the periphery thereof.

A U-shaped bracket 26 having a pair of end flanges bridges the outer end of the inlet opening 20 in critically spaced relation thereto, the flanges being secured to the closure 18 by bolts 30. The bracket includes an aperture 32 receiving the upper threaded end of a fuel supply riser 34, and a pair of nuts 36 and 38 on opposite sides of the aperture retain the bracket in position over the supply riser. The upper end of the riser threadedly receives a fuel atomizer 40 disposed to direct the atomized fuel through the inlet opening 20 into the combustion chamber 15.

A baffle 42, supported on a second U-shaped bracket 44, is disposed above and in spaced relation from the inlet opening 20 and from the fuel atomizer 40. The bracket 44 is welded at 46 within the upstanding legs of the bracket 26, and the baffle 42 is welded at 48 to the bracket 44. The brackets 26 and 44 retain the centers of the atomizer 40 and baffle 42, respectively, in coaxial relation with each other and with the axis of the inlet opening 20, which lies along the longitudinal axis of the combustor 12.

The riser 34 constitutes a branch or outlet of a typical fuel supply installation in an orchard, grove or field in which fruit, vegetables or flowers may be grown. Such fuel supply installation includes a number of outlets from a common supply conduit, the conduit being supplied with a liquid hydrocarbon fuel under pressure, as by a suitable pump, and the outlets being judiciously distributed throughout the orchard, grove, or field. The heaters may be easily and simply attached to or removed from the risers by manipulating the nuts 36 and 38 in an obvious manner, and a suitable cap applied to the upper end of the riser 34 when the heater is removed. If desired, a valve can be provided in the riser 34 to cut off the supply of fuel in an obvious manner.

In operation, assuming that the heater 10 is attached to the upper end of a riser 34, the supply of fuel to the heater is activated, whereby the atomizer directs a cone-shaped jet of highly atomized fuel upwardly through the inlet opening 20. The cone-shaped jet may be a hollow cone or a filled cone, depending upon the construction of the atomizer, but in either case the jet of fuel entrains the proper amount of air from the ambient atmosphere which passes upwardly through the inlet opening 20 together with the jet, the jet of fuel and the entrained atmospheric air becoming thoroughly and homogeneously mixed in the combustion chamber in the lower end of the combustor. The baffle 42 diverts the incoming fuel and air toward the side wall 14 of the combustion chamber. A spark igniter may be provided, if desired, but in an installation of this type where a suitable supply of electrical energy is not available, ignition can be simply and quickly initiated by tossing a lighted match into the upper end of the combustor, or by applying a lighted torch, carried on a moving vehicle, to the lower end of the heater to ignite the jet discharged from the nozzle.

Combustion is instantaneously initiated and continues in a stable manner so long as the fuel supply is maintained. Combustion occurs within the combustor and is completed before the mixture of air and atomized fuel reaches the open upper or discharge end 16, so that only completely burned products of combustion discharge therefrom. The heat contained in the hot products of combustion, and the radiant heat emitting from the tubular side wall 14, provide the heat to avert the effects of killing frost to the fruit, vegetables, or flowers to be protected.

In order that a blowerless heater of the type described in detail above can operate with complete and stabilized combustion using the heavier and less costly hydrocarbon liquid fuels, such as, for example, diesel fuels 2 and 3 and fuel oils 1, 2 and 3, I have discovered, through considerable analysis, investigation and experiment, that certain critical sizes, dimensions, and relationships of parts must be observed. These critical values are as follows: The legs should support the bottom wall or closure 14 of the combustor 12 not less than 3½ inches and not more than 4½ inches from the ground or other supporting base 50. A height of 3½ inches gives optimum results. The diameter of the combustor should be a minimum of 12 inches, and the combustor should have a minimum height of 30 inches, or a ratio of height to diameter of combustor of subsequently 2½ to 1. Below this ratio combustion falls off markedly and disappears. Excellent results have been obtained with combustors 33 inches in height and 12 inches in diameter, and with combustors 36 inches in height and 14 inches in diameter. The upper limit in height of the combustor is dictated by practical considerations, which should fix it at not more than 6 feet. These practical considerations are as follows: Combustion is usually complete with a combustor height of 5 to 6 feet with heavy grades of fuels, and any increase above this height calls for the use of more material. Any unnecessary length of combustor increases the bulkiness and weight, and therefore would be impractical. Furthermore, any increase in height above 6 feet would make observation of combustion conditions more difficult.

For atomizers delivering ¾ gallon and 1 gallon of fuel per hour, which are the most commonly employed, the inlet opening 20 should have a diameter of substantially 3½ inches, the tip of the atomizer 40 should be substantially 1¼ inches below the inlet opening 20, the baffle 42 should have a diameter not less than 2¼ inches and not more than 2¾ inches and should be positioned not less than 3 inches nor fore than 5½ inches above the atomizer tip. Experiment has proved that when a blowerless heater of the type described above is constructed by observing these critical values, combustion conditions in the absence of a blower or other positive means to supply combustion air are optimum, and that outside of these critical values the combustion efficiency falls off markedly or is nonexistent, the combustion conditions being marked by excessive smoke and soot formation and/or instability of combustion.

I claim:

1. A blowerless heater for burning an atomized liquid fuel, comprising: a combustor of elongated tubular form having an upper unrestricted discharge end and a closure on the lower end, said closure having an inlet opening for the admission of a mixture of atomized fuel and entrained atmospheric air into the interior of said combustor; means supporting said combustor on a supporting base in an upright position; atomizing means disposed below said opening, exteriorly of said combustor, directing a jet of atomized fuel through said inlet opening into the interior of said combustor; baffle means disposed within said combustor and above said inlet opening; said combustor having a minimum height of substantially 30 inches and a maximum height dictated by practical considerations, the ratio of height to diameter being substantially 2½ to 1; said fuel atomizing means having a fuel discharge capacity of from ¾ to 1 gallon per hour; said inlet opening having a diameter of substantially 3½ inches; the tip of said atomizing means being disposed substantially 1¼ inches below said inlet opening; said baffle means disposed not less than 3 inches and not more than 5 inches above the tip of said atomizing means and having a diameter not less than 2¼ inches and not more than 2¾ inches.

2. A blowerless heater as defined in claim 1, in which said supporting means includes legs having a length to support said combustor whereby said inlet opening is not less than 3½ inches and not more than 4½ inches above the supporting base.

3. A blowerless heater as defined in claim 1, in which the center of the tip of said fuel atomizing means, the center of said inlet opening, and the center of said baffle means lie along the longitudinal axis of said combustor.

References Cited

UNITED STATES PATENTS

| | | | |
|---|---|---|---|
| 2,269,831 | 1/1942 | Senner et al. | 126—59.5 X |
| 3,409,000 | 11/1968 | Brader et al. | 126—59.5 |
| 3,409,001 | 11/1968 | Franke | 126—59.5 |

FOREIGN PATENTS 355,645  8/1961  Switzerland.

CHARLES J. MYHRE, Primary Examiner

U.S. Cl. X.R.

431—353